Nov. 19, 1929. T. F. TAYLOR 1,736,232
DIRIGIBLE HEADLIGHT
Filed Aug. 23, 1926 2 Sheets-Sheet 1
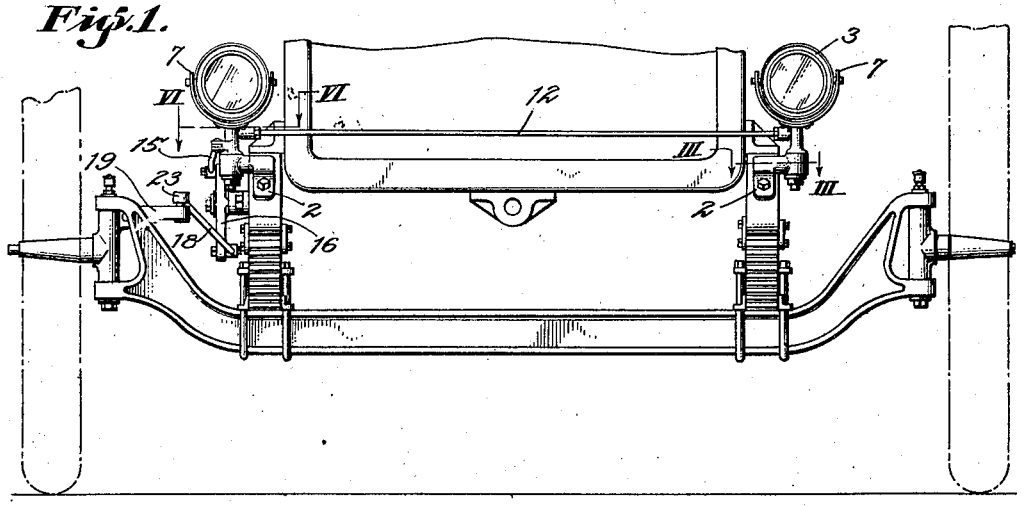
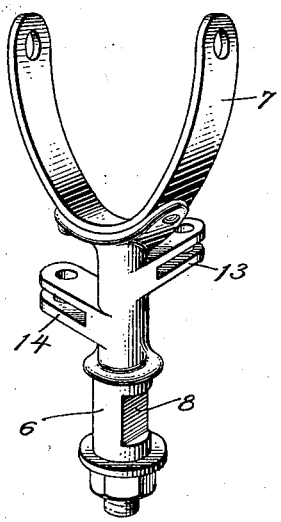
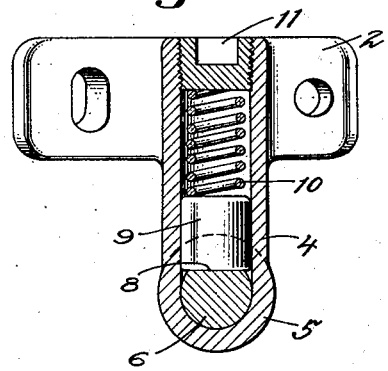
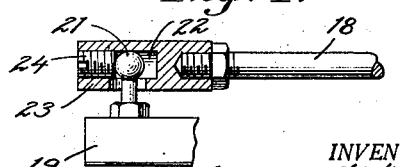
INVENTOR.
Thomas F. Taylor
BY
Townsend, Loftus & Hett
ATTORNEYS.

Nov. 19, 1929.  T. F. TAYLOR  1,736,232
DIRIGIBLE HEADLIGHT
Filed Aug. 23, 1926   2 Sheets-Sheet 2
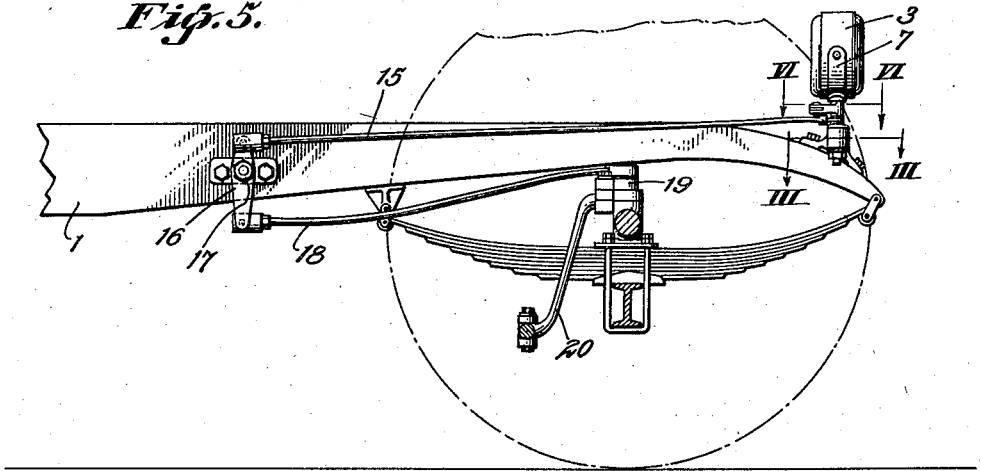
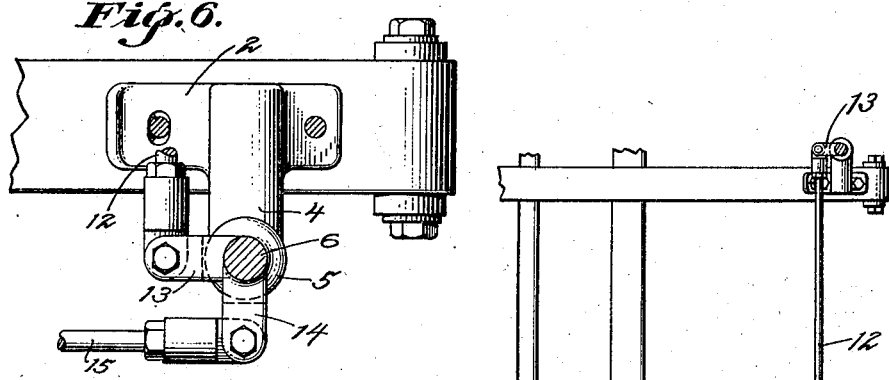
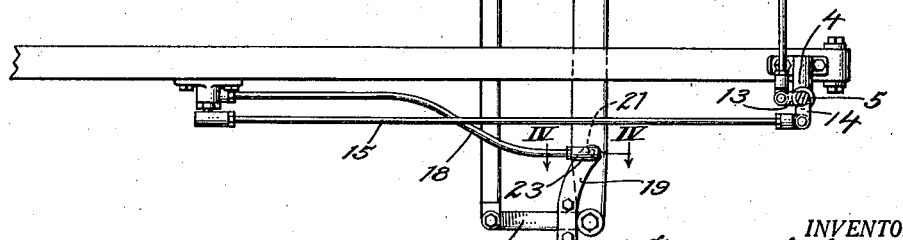
INVENTOR.
Thomas F. Taylor
BY
ATTORNEYS.

Patented Nov. 19, 1929

1,736,232

UNITED STATES PATENT OFFICE

THOMAS F. TAYLOR, OF SAN FRANCISCO, CALIFORNIA

DIRIGIBLE HEADLIGHT

Application filed August 23, 1926. Serial No. 130,936.

This invention relates to dirigible headlights for vehicles, and has for its object to provide a simple and inexpensive connection between the steering mechanism of the vehicle and the swiveled headlight for turning the latter in conformity with the changes in the position of the steering wheels, the particular object being to eliminate any tendency of the headlight to vibrate due to the vibrations in the steering mechanism of the vehicle.

In my co-pending application, Serial No. 63,807, filed October 21, 1925, is disclosed a mechanism for this purpose. Such mechanism is particularly adapted for use on certain makes of automobiles. My present invention herein is for an improvement thereover and is adapted for universal use on all motor vehicles.

When a dirigible headlight is connected directly to the steering mechanism of a vehicle, the vibrations of the vehicle are directly imparted to the headlight through such connection. A loose joint has been placed in this connection to eliminate this vibration and in my said co-pending application I have disclosed a resilient means normally acting on the mechanism to hold the lights in their forwardly directed position and against vibration, this means being embodied in the said connection between the steering mechanism and the lights.

In my present invention I provide a resilient means acting against a pivoted flat surface connected to the light for normally holding the light in its forwardly directed position, pivotal movement of the light from such position acting to compress the resilient means. While I may ordinarily prefer to locate this resilient means adjacent to and in a position acting directly on the light supporting post, as illustrated in the drawing, it will be understood that the scope of my invention does not limit the placing of this means at any particular point.

I have found, however, that the locating of this means closely adjacent the light ordinarily serves the purpose of holding the light in its forwardly directed position and against vibration with greater efficiency than when the resilient means is located at a point further remote from the light. In the latter case the portion of the connection located between such means and the light permits lost motion and thereby permits the light to vibrate. I have also found that a further efficiency is obtained by locating the above-mentioned loose joint at the point of the said connection furthest removed from the light and its anti-vibrating means. It is the object of my invention herein to provide an improved dirigible headlight mechanism embodying these improved features.

In the accompanying drawings I have illustrated one specific embodiment of my invention, but it will be understood that the invention can be otherwise embodied and that the drawings are not to be construed as defining or limiting the scope of the invention, the claim appended hereto being relied upon for that purpose.

Referring to the figures of the drawings:

Fig. 1 is a front view of a motor vehicle having my invention mounted thereon.

Fig. 2 is a perspective view of a portion of a light post and bracket.

Fig. 3 is a sectional view of a detail taken on line III—III of Figure 1.

Fig 4 is a fragmentary sectional view taken on line IV—IV of Figure 7.

Fig. 5 is a side elevation of the vehicle.

Fig. 6 is a detail view taken on line VI—VI of Figure 5.

Fig. 7 is a fragmentary plan view of the vehicle frame and illustrating my invention mounted thereon.

In the drawings, 1 indicates the frame of a vehicle on the front end of which is mounted a pair of brackets 2 supporting a pair of dirigible headlights 3. Each bracket comprises a base portion 2 and a laterally extending tubular portion 5 for receiving the portion 6 of the post of the light bracket 7. A flat 8 is formed on the portion 6 of the post and is adapted to be engaged by the flat end of a plunger 9, in the tubular portion 4, and normally held in engagement with the flat by a spring 10, the spring being held in place by a threaded plug 11. The location of the flat 8 is such that the light is normally held in its forwardly directed position by the plunger 9.

As just stated, the lights 3 are normally held in the forwardly directed position by the plungers 9 acting directly on the post flat 8. Any connection most convenient to each particular car can be used for connecting the lights with the steering mechanism whereby the lights will be turned on their pivots in accordance with the steering of the vehicle. In the accompanying drawings, I have illustrated the following mechanism for performing this function.

When two lights are used, the same are connected by a rod 12 connected to a pair of arms 13 on the light posts. A second arm 14 on one of the light posts is connected by a rod 15 to the upper end of a lever 16 pivoted to the frame at 17. A rod 18 connected to the lower end of this lever has its forward end connected to an arm 19 clamped to the steering arm 20.

As illustrated in Fig. 4, a loose joint is provided between the rod 18 and the arm 19. An upwardly extending post on the free end of the arm 19 has a ball 21 on its free end engaging in a bore 22 of a member 23 carried on the end of the rod 18. The ball is permitted a slight movement axially of the bore between the plug 24 and the end of the bore.

It is believed that the advantages of my invention as herein set forth and illustrated will be obvious. I particularly desire to emphasize the novelty and great value of my improved light holding means, this means being the said resilient means which acts against a flat pivoted surface connected to the light and normally holding the light in its forwardly directed position and always acting to hold the light free from vibration.

I also wish to emphasize the importance of holding the light in its forwardly directed position by means adjacent to and acting on the light post. By thus locating this holding and anti-vibrating means directly at the light, no intermediate connections are left between this means and the light which would, after some use, become loose and permit the light to vibrate. Furthermore, I desire to emphasize the further importance of placing the loose joint 21 of the means connecting the steering mechanism to the light at a point closely adjacent the steering mechanism and furthest removed from the light and its holding and anti-vibrating means. By so locating these parts, the lights are always held in their forwardly directed position and free from vibration until the steering mechanism is turned in one direction or the other sufficiently to take up the lost motion at 21 and also any further lost motion in the connection to the light. Furthermore, since this light-turning force always operates against the action of the spring 10, the lights are at all times held against any loose vibration, whether the lights be in their normal forwardly directed position or in any turned position.

Having thus described my invention, what I claim and desire to secure by Letters Patent is:

The combination with a vehicle steering mechanism and a swiveled lamp on the frame of the vehicle, of means connected with the steering mechanism for turning the lamp, said connecting means including a loose coupling whereby minor movements of the steering mechanism are not transmitted to the lamp, and yielding means for normally holding the lamp in central position, said yielding means comprising a post on which the lamp is supported and having a flattened surface, a bracket provided with a laterally extending tubular portion having a bearing at one end to receive the said post and interiorly threaded at the other end, a plunger slidable in the tubular portion and engaging with the flattened surface of the post, a spring housed within the tubular portion and bearing against the plunger, and an adjustable threaded plug mounted in the inner end of the tubular portion and forming an abutment for and adapted to vary the tension of the said spring.

THOMAS F. TAYLOR.